(12) United States Patent
Shim et al.

(10) Patent No.: US 9,416,855 B2
(45) Date of Patent: Aug. 16, 2016

(54) WIRE CONNECTION APPARATUS

(71) Applicant: Samsung Electronics Co., Ltd., Suwon-si (KR)

(72) Inventors: Young Bo Shim, Seoul (KR); Young Do Kwon, Yongin-si (KR); Byung June Choi, Gunpo-si (KR); Yong Jae Kim, Seoul (KR); Kyung Shik Roh, Seongnam-si (KR); Min Hyung Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 14/270,880

(22) Filed: May 6, 2014

(65) Prior Publication Data

US 2014/0331798 A1 Nov. 13, 2014

(30) Foreign Application Priority Data

May 7, 2013 (KR) .................. 10-2013-0051483

(51) Int. Cl.
*F16H 19/08* (2006.01)
*B25J 9/10* (2006.01)

(52) U.S. Cl.
CPC ............... *F16H 19/08* (2013.01); *B25J 9/104* (2013.01); *F16H 2019/085* (2013.01); *Y10T 74/18848* (2015.01)

(58) Field of Classification Search
CPC ............. B25J 9/104; Y10T 74/18848; F16H 2019/085; F16H 19/08
See application file for complete search history.

(56) References Cited

U.S. PATENT DOCUMENTS

| 5,710,870 | A | * | 1/1998 | Ohm et al. ................. 700/263 |
| 2004/0199147 | A1 | | 10/2004 | Nishizawa et al. |
| 2009/0148263 | A1 | | 6/2009 | Lee et al. |
| 2010/0011899 | A1 | * | 1/2010 | Kim et al. ................. 74/490.04 |
| 2010/0256815 | A1 | * | 10/2010 | Salisbury et al. ............. 700/260 |
| 2011/0163561 | A1 | * | 7/2011 | Kim et al. ................. 294/111 |

FOREIGN PATENT DOCUMENTS

| JP | 2009-197992 A | 9/2009 |
| KR | 10-0997140 B1 | 11/2010 |
| KR | 10-2011-0080922 A | 7/2011 |
| KR | 10-2012-0034324 A | 4/2012 |

OTHER PUBLICATIONS

Extended European Search Report issued on May 4, 2015, in counterpart European Application No. 14167150.3 (7 pages, in English).

* cited by examiner

*Primary Examiner* — Terence Boes
(74) *Attorney, Agent, or Firm* — NSIP Law

(57) ABSTRACT

A wire connection apparatus includes a link unit and a drive unit configured to drive the link unit. The link unit includes a first link, a second link rotatably coupled to the first link, a third link rotatably coupled to the second link, a plurality of wires, each of which is fixed at one end thereof to the third link, and is fixed at the other end thereof to the drive unit, and through which a driving force is transmitted from the drive unit to the third link, a path forming structure to form a path of each of the wires between the drive unit and the third link, and a length holding structure to hold constant a length of each of the wires between the drive unit and the third link.

20 Claims, 8 Drawing Sheets

WIRE CONNECTION APPARATUS

CROSS-REFERENCE TO RELATED APPLICATIONS

This application claims the benefit of Korean Patent Application No. 10-2013-0051483 filed on May 7, 2013 in the Korean Intellectual Property Office, the entire disclosure of which is incorporated herein by reference for all purposes.

BACKGROUND

1. Field

This application relates to a wire connection apparatus to drive links using wires.

2. Description of Related Art

There is a drive structure using wires as a structure that allows a mechanism configured by a plurality of links to be driven. In the drive structure using the wires, a driver is not directly connected to an end effecter or an articulated joint through which one link is joined to another link, but is located at a part that has no motion or little motion, so the link may be minimized in weight, size, and inertia. Therefore, an advantageous design is possible in terms of driving efficiency and stability of a robot.

In the drive structure using the wires, the wires are typically connected to the driver via a plurality of moving links. In this case, a length of a path of each wire varies according to a motion of a link between the end effecter and the driver and a motion of the articulated joint through which one link is joined to another link, thereby resulting in a coupled motion of the end effecter. That is, the motion of the link or the articulated joint will cause the end effecter to move even if the driver is in a fixed state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wire connection apparatus includes a link unit; and a drive unit configured to drive the link unit; wherein the link unit includes a first link; a second link rotatably coupled to the first link; a third link rotatably coupled to the second link; a plurality of wires, each of which is fixed at one end thereof to the third link, and is fixed at the other end thereof to the drive unit, and through which a driving force is transmitted from the drive unit to the third link; a path forming structure to form a path of each of the wires between the drive unit and the third link; and a length holding structure to hold constant a length of each of the wires between the drive unit and the third link.

The first link may include a first rotation shaft and a second rotation shaft that are spaced apart from each other; the second link may be rotatably coupled to the first rotation shaft; and the path forming structure may include a first pulley rotatably coupled to the first rotation shaft; a second pulley rotatably coupled to the second rotation shaft; a third pulley rotatably coupled to the second rotation shaft; and a plurality of fourth pulleys rotatably coupled to the second pulley.

The plurality of wires may be wound around the first pulley, the second pulley, the fourth pulleys, and the third pulley in serial order from the third link to the drive unit.

The plurality of wires may include a first wire and a second wire; and the first wire may be wound around the first pulley in a first direction, wound around the second pulley and the fourth pulleys in a second direction opposite to the first direction, and wound around the third pulley in the first direction.

The second wire may be wound around each of the first pulley, the second pulley, the fourth pulleys, and the third pulley in a direction opposite to the direction in which the first wire is wound around each of the first pulley, the second pulley, the fourth pulleys, and the third pulley.

The length holding structure may include a first interlocking gear arranged in the second link; and a second interlocking gear arranged in the second pulley to engage with the first interlocking gear.

The second interlocking gear may be configured to rotate in a direction opposite to the second link.

A sum of a radius of the first pulley and a radius of the second pulley may be equal to a length of a straight line between a center of rotation of the first pulley and a center of rotation of the second pulley.

A sum of a radius of the third pulley and a diameter of each of the fourth pulleys may be equal to a radius of the second pulley.

The fourth pulleys may be a pair of fourth pulleys; and the pair of fourth pulleys may be symmetrically arranged with respect to a straight line joining a center of rotation of the first pulley and a center of rotation of the second pulley.

The plurality of wires may include a pair of first wires and a pair of second wires; the wire connection apparatus may further include a first divergence roller disposed between the third link and the first pulley to diverge the pair of first wires from each other; a second divergence roller disposed between the third link and the first pulley to diverge the pair of second wires from each other; a first coupling roller disposed between the third pulley and the drive unit to couple together the pair of first wires that are diverged from each other; and a second coupling roller disposed between the third pulley and the drive unit to couple together the pair of second wires that are diverged from each other; and the pair of first wires and the pair of second wires may be wound around the first pulley, the second pulley, the fourth pulleys, and the third pulley in directions opposite to each other.

In another general aspect, a wire connection apparatus includes a link unit; and a drive unit configured to drive the link unit; wherein the link unit may include a first link; a second link rotatably coupled to the first link; a third link rotatably coupled to the second link; a first pulley configured to freely rotate about a same axis as the second link; a second pulley configured to interlock with the second link and rotate as the second link rotates; a third pulley configured to freely rotate about a same axis as the second pulley; a plurality of fourth pulleys coupled to the second pulley and configured to freely rotate; and a plurality of wires connected from the third link to the drive unit via, in serial order, the first pulley, the second pulley, the fourth pulleys, and the third pulley.

The plurality of wires may include a first wire and a second wire; the first wire may be wound around the first pulley in a first direction, wound around the second pulley and a first one of the fourth pulleys in a second direction opposite to the first direction, and wound around the third pulley in the first direction; and the second wire may be wound around each of the first pulley, the second pulley, a second one of the fourth pulleys, and the third pulley in a direction opposite to the direction in which the first wire is wound around each of the first pulley, the second pulley, the first one of the fourth pulleys, and the third pulley.

The wire connection apparatus may further include a first interlocking gear arranged in the second link; and a second interlocking gear arranged in the second pulley to engage with the first interlocking gear.

The second pulley may be configured to rotate in the second direction as the second link rotates in the first direction to hold constant respective lengths of the first wire and the second wire between the third link and the drive unit; and the second pulley may be further configured to rotate in the first direction as the second link rotates in the second to hold constant the respective lengths of the first wire and the second wire between the third link and the drive unit.

The plurality of wires may include a pair of first wires and a pair of second wires; and the wire connection apparatus may further include a first divergence roller disposed between the third link and the first pulley to diverge the pair of first wires from each other; a second divergence roller disposed between the third link and the first pulley to diverge the pair of second wires from each other; a first coupling roller disposed between the third pulley and the drive unit to couple the pair of first wires that are diverged from each other; and a second coupling roller disposed between the third pulley and the drive unit to couple the pair of second wires that are diverged from each other.

In another general aspect, a wire connection apparatus includes a base link; a middle link rotatably coupled to the base link and configured to rotate relative to the base link without changing an axis of rotation of the middle link; an end effecter rotatably coupled to the middle link; and at least one wire traversing a path along the base link and the middle link from a reference point and fixed to the end effecter; wherein a length of the at least one wire from the reference point to the end effecter is held constant even when the middle link rotates.

The wire connection apparatus may further include a drive unit; and the reference point may be a portion of the drive unit.

The at least one wire may include a first wire traversing a first path between the reference point and the end effecter; and a second wire traversing a second path different from the first path between the reference point and the end effecter.

The at least one wire may include a pair of wires that are diverged from each other in at least a partial section of the connection apparatus between the reference point and the end effecter.

In another general aspect, a wire connection apparatus includes a base link; a middle link rotatably coupled to the base link and configured to rotate relative to the base link about an axis of rotation that is fixed relative to the base link; an end effecter rotatably coupled to the middle link; at least one wire fixed to the end effecter and traversing a path from the end effecter to at least one reference point along the middle link and the base link; and a path forming structure configured to hold constant a length of the at least one wire from the reference point to the end effecter as the middle link rotates without diverging the at least one wire from the middle link and the base link.

The path forming structure may prevent the end effecter from moving relative to the middle link as the middle link rotates when a driving force is not applied to the end effecter.

The reference point may include a first reference point and a second reference point different from the first reference point; and the at least one wire may include a first wire traversing a first path from the end effecter to the first reference point; and a second wire traversing a second path from the end effecter to the second reference point.

The at least one wire may include a first wire traversing a first path from the end effecter to the reference point; and a second wire traversing a second path different from the first path from the end effecter to the reference point.

The first wire and the second wire may traverse a same path in a portion of the first path and a portion of the second path; and the first wire and the second wire may traverse different paths in another portion of the first path and another portion of the second path.

Other features and aspects will be apparent from the following detailed description, the drawings, and the claims.

DETAILED DESCRIPTION

Figure 1:
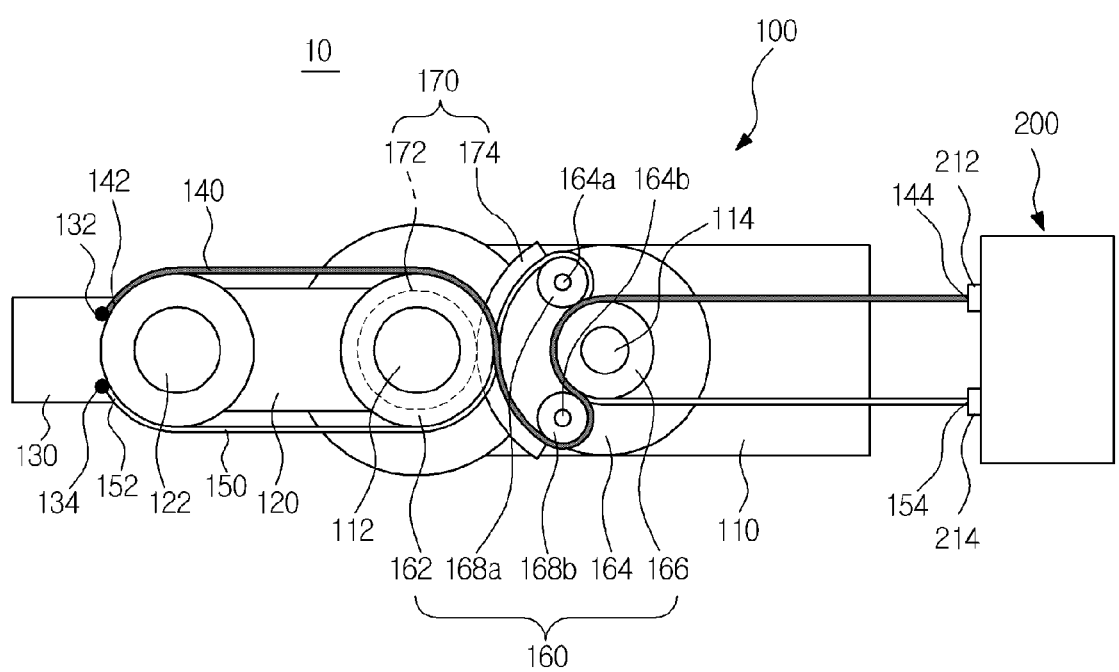
FIG. 1 illustrates an example of a link unit and a drive unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Throughout the drawings and the detailed description, the same reference numerals refer to the same elements. The drawings may not be to scale, and the relative size, proportions, and depiction of elements in the drawings may be exaggerated for clarity, illustration, and convenience.

In this application, for convenience of description, a first direction A refers to a clockwise direction, and a second direction B refers to a counterclockwise direction.

Figure 2A:
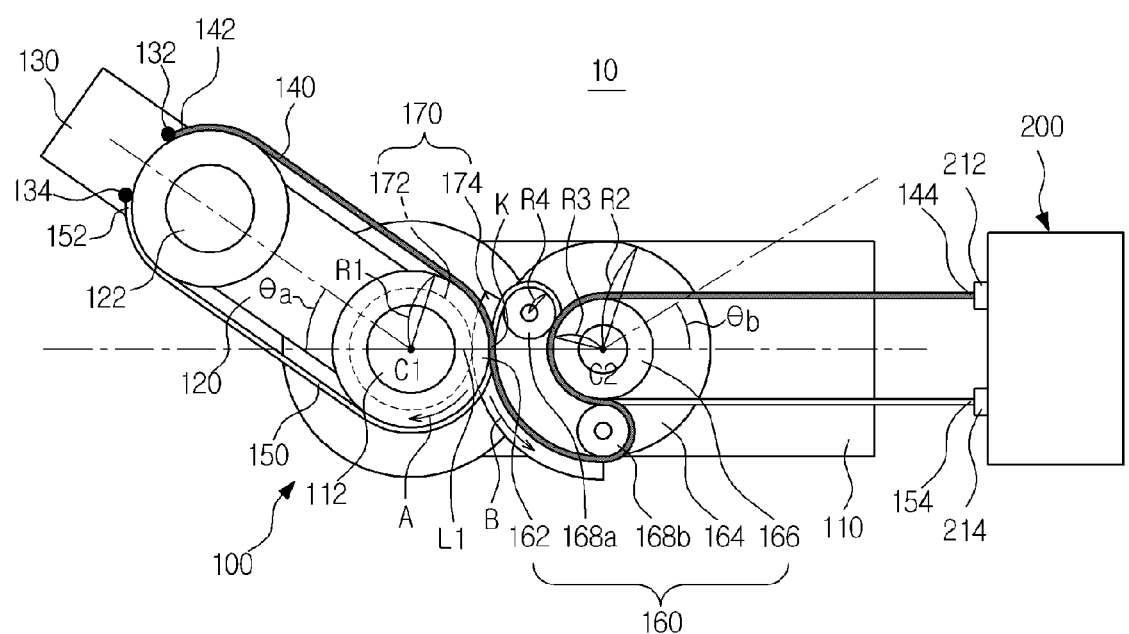
FIGS. 2A and 2B illustrate examples of a state in which the link unit is driven and operated.
Figure 2B:
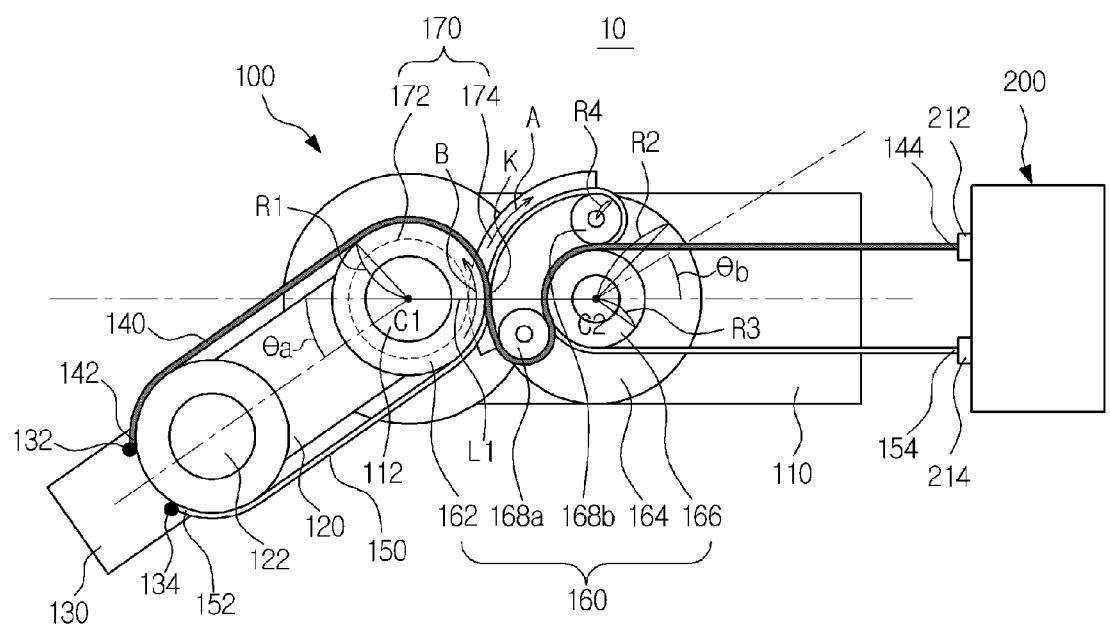

FIG. 1 illustrates an example of a link unit and a drive unit. FIGS. 2A and 2B illustrate examples of a state in which the link unit is driven and operated.

As shown in FIGS. 1 to 2B, a wire connection apparatus 10 includes a link unit 100 and a drive unit 200 to drive the link unit 100.

The link unit 100 includes a plurality of links 110, 120, and 130 arranged in a line, a plurality of wires 140 and 150 through which a driving force of the drive unit 200 is transmitted to the link 130 constituting an end effecter 130, a path forming structure 160 to form paths of the wires 140 and 150 between the drive unit 200 and the end effecter 130, and a length holding structure 170 to hold constant lengths of the wires 140 and 150 between the drive unit 200 and the end effecter 130.

The plurality of links 110, 120, and 130 include a base link 110, a middle link 120 rotatably coupled to the base link 110, and an end effecter 130 rotatably coupled to the middle link 120.

The base link 110 includes a first rotation shaft 112 rotatably coupled with the middle link 120 and a first pulley 162 that will be described later, and a second rotation shaft 114 rotatably coupled to a second pulley 164 and a third pulley 166 that will be described later. The first and second rotation shafts 112 and 114 protrude from one side of the base link 110 and are spaced apart from each other on the one side of the base link 110.

The middle link 120 includes a third rotation shaft 122 rotatably coupled with the end effecter 130.

The end effecter 130 is provided with a first wire fixing portion 132 and a second wire fixing portion 134 to which respective ends of the wires 140 and 150 are fixed.

The end effecter 130 is not limited to being a link located at an end or a tip of the link unit 100 only, but may be a link between the links or another middle link. Accordingly, for convenience of description below, the base link 110, the middle link 120, and the end effecter 130 will be referred to as a first link 110, a second link 120, and a third link 130 in order of increasing distance from the drive unit 200.

The wires 140 and 150 include a first wire 140 and a second wire 150 to rotate the third link 130.

One end 142 of the first wire 140 is fixed to the first wire fixing portion 132 of the third link 130, and the other end 144 of the first wire 140 is fixed to a third wire fixing portion 212 of the drive unit 200, which is a reference point measuring the length of the wire 140.

Similarly, one end 152 of the second wire 150 is fixed to the second wire fixing portion 134 of the third link 130, and the other end 154 of the second wire 150 is fixed to a fourth wire fixing portion 214 of the drive unit 200, which is a reference point measuring the length of the wire 150.

The second and third links 120 and 130 rotate in the first direction A or the second direction B opposite to the first direction A due to a difference in tensions applied to the first and second wires 140 and 150.

The path forming structure 160 includes the first pulley 162 rotatably coupled to the first rotation shaft 112, the second pulley 164 rotatably coupled to the second rotation shaft 114, the third pulley 166 rotatably coupled to the second rotation shaft 114 and spaced apart from the second pulley 164 in an axial direction of the second rotation shaft 114, and a pair of fourth pulleys 168a and 168b rotatably coupled to the second pulley 164.

The first pulley 162 is coupled to the first rotation shaft 112 so as to freely rotate about the first rotation shaft 112. The first and second wires 140 and 150 are wound around the first pulley 162 in opposite directions to each other. In the examples of FIGS. 2A and 2B, the first wire 140 is wound around the first pulley 162 in the first direction A when viewed from the first wire fixing portion 132, and the second wire 150 is wound around the first pulley 162 in the second direction B when viewed from the second wire fixing portion 134.

The second pulley 164 interlocks with the second link 120 and rotates by the action of the length holding structure 170 that will be described later, and includes a pair of fourth rotation shafts 164a and 164b rotatably coupled with the pair of fourth pulleys 168a and 168b. The first and second wires 140 and 150 are wound around the second pulley 164 in opposite directions to each other. In the examples of FIGS. 2A and 2B, the first wire 140 is wound around the second pulley 164 in the second direction B when viewed from the first wire fixing portion 132, and the second wire 150 is wound around the second pulley 164 in the first direction A when viewed from the second wire fixing portion 134.

The first and second pulleys 162 and 164 may be arranged such that a sum of a radius R1 of the first pulley 162 and a radius R2 of the second pulley 164 is equal to a length of a straight line L1 between a center of rotation C1 of the first pulley 162 and a center of rotation C2 of the second pulley 164.

The third pulley 166 is coupled to the second rotation shaft 114 so as to freely rotate about the second rotation shaft 114. The first and second wires 140 and 150 are wound around the third pulley 166 in opposite directions to each other. In the examples of FIGS. 2A and 2B, the first wire 140 is wound around the third pulley 166 in the first direction A when viewed from the first wire fixing portion 132, and the second wire 150 is wound around the third pulley 166 in the second direction B when viewed from the second wire fixing portion 134.

The pair of fourth pulleys 168a and 168b are coupled to the pair of fourth rotation shaft 164a and 164b, respectively, so as to freely rotate about the pair of fourth rotation shaft 164a and 164b, respectively. The first and second wires 140 and 150 are wound around the fourth pulleys 168a and 168b, respectively, in opposite directions to each other. In the examples of FIGS. 2A and 2B, the first wire 140 is wound around the pulley 168b of the pair of fourth pulleys 168a and 168b in the second direction B when viewed from the first wire fixing portion 132, and the second wire 150 is wound around the fourth pulley 168a in the first direction A when viewed from the second wire fixing portion 134.

The third pulley 166 and the pair of fourth pulleys 168a and 168b may be arranged such that a sum of a radius R3 of the third pulley 166 and a diameter 2×R4 of each of the pair of fourth pulleys 168a and 168b is equal to a radius R2 of the second pulley 164.

In addition, the pair of fourth pulleys 168a and 168b may be symmetrically arranged with respect to the straight line L1 joining the center of rotation C1 of the first pulley 162 and the center of rotation C2 of the second pulley 164.

To summarize the paths of the first and second wires 140 and 150 defined by the above-mentioned path forming structure 160, the first wire 140 is fixed to the first wire fixing portion 132, moves along the second link 120, is wound around the first pulley 162 in the first direction A, is wound around the second and fourth pulleys 164 and 168b in the second direction B, is wound around the third pulley 166 in the first direction A, and is then fixed to the third wire fixing portion 212. The second wire 150 is fixed to the second wire fixing portion 134, moves along the second link 120, is wound around the first pulley 162 in the second direction B, is wound around the second and fourth pulleys 164 and 168a in the first direction A, is wound around the third pulley 166 in the second direction B, and is then fixed to the fourth wire fixing portion 214.

The length holding structure 170 includes a first interlocking gear 172 arranged in the second link 120 and a second interlocking gear 174 arranged in the second pulley 164 to engage with the first interlocking gear 172. The first interlocking gear 172 may be formed integrally with the second link 120, and the second interlocking gear 174 may be formed integrally with the second pulley 164.

The second interlocking gear 174 allows the second pulley 164 to rotate in a direction opposite to the rotation direction of the second link 120 during rotation of the second link 120 relative to the first link 110, with the consequence that the length of the first wire 140 between the first wire fixing portion 132 and the third wire fixing portion 212 and the length of the second wire 150 between the second wire fixing portion 134 and the fourth wire fixing portion 214 are held constant.

As shown in FIG. 2A, when the second interlocking gear 174 engaging with the first interlocking gear 172 and the second pulley 164 rotate in the second direction B as the second link 120 and the first interlocking gear 172 rotate in the first direction A, the length of the first wire 140 between the first wire fixing portion 132 and the third wire fixing portion 212 and the length of the second wire 150 between the second wire fixing portion 134 and the fourth wire fixing portion 214 are held constant.

The length of the first wire 140 from the first wire fixing portion 132 to a point K at which the first wire 140 is decoupled from the second link 120 and begins to be wound around the second pulley 164 by rotation of the second link 120 and the first interlocking gear 172 in the first direction A is decreased, compared with a state in which the second link 120 and the first link 110 are arranged in a straight line as shown in FIG. 1. In this case, however, the length of the first wire 140 to the third wire fixing portion 212 from the point K at which the first wire 140 is decoupled from the second link 120 and begins to be wound around the second pulley 164 by rotation of the second pulley 164 in the second direction B is increased, thereby offsetting the decreased length of the first wire 140 from the first wire fixing portion 132 to the point K at which the first wire 140 is decoupled from the second link 120 and begins to be wound around the second pulley 164. Consequently, the length of the first wire 140 between the first wire fixing portion 132 and the third wire fixing portion 212 is always held constant.

In addition, the length of the second wire 150 from the second wire fixing portion 134 to a point K at which the second wire 150 is decoupled from the second link 120 and begins to be wound around the second pulley 164 by rotation of the second link 120 and the first interlocking gear 172 in the first direction A is increased, compared with a state in which the second link 120 and the first link 110 are arranged in a straight line as shown in FIG. 1. In this case, however, the length of the second wire 150 to the fourth wire fixing portion 214 from the point K at which the second wire 150 is decoupled from the second link 120 and begins to be wound around the second pulley 164 by rotation of the second pulley 164 in the second direction B is decreased, thereby offsetting the increased length of the second wire 150 from the second wire fixing portion 134 to the point K at which the second wire 150 is decoupled from the second link 120 and begins to be wound around the second pulley 164. Consequently, the length of the second wire 150 between the second wire fixing portion 134 and the fourth wire fixing portion 214 is always held constant.

As shown in FIG. 2B, when the second interlocking gear 174 engaging with the first interlocking gear 172 and the second pulley 164 rotate in the first direction A as the second link 120 and the first interlocking gear 172 rotate in the second direction B, the length of the first wire 140 between the first wire fixing portion 132 and the third wire fixing portion 212 and the length of the second wire 150 between the second wire fixing portion 134 and the fourth wire fixing portion 214 are held constant.

The length of the first wire 140 from the first wire fixing portion 132 to the point K at which the first wire 140 is decoupled from the second link 120 and begins to be wound around the second pulley 164 by rotation of the second link 120 and the first interlocking gear 172 in the second direction B is increased, compared with a state in which the second link 120 and the first link 110 are arranged in a straight line as shown in FIG. 1. In this case, however, the length of the first wire 140 to the third wire fixing portion 212 from the point K at which the first wire 140 is decoupled from the second link 120 and begins to be wound around the second pulley 164 by rotation of the second pulley 164 in the first direction A is decreased, thereby offsetting the increased length of the first wire 140 from the first wire fixing portion 132 to the point K at which the first wire 140 is decoupled from the second link 120 and begins to be wound around the second pulley 164. Consequently, the length of the first wire 140 between the first wire fixing portion 132 and the third wire fixing portion 212 is always held constant.

In addition, the length of the second wire 150 from the second wire fixing portion 134 to the point K at which the second wire 150 is decoupled from the second link 120 and begins to be wound around the second pulley 164 by rotation of the second link 120 and the first interlocking gear 172 in the second direction B is decreased, compared with a state in which the second link 120 and the first link 110 are arranged in a straight line as shown in FIG. 1. In this case, however, the length of the second wire 150 to the fourth wire fixing portion 214 from the point K at which the second wire 150 is decoupled from the second link 120 and begins to be wound around the second pulley 164 by rotation of the second pulley 164 in the first direction A is increased, thereby offsetting the decreased length of the second wire 150 from the second wire fixing portion 134 to the point K at which the second wire 150 is decoupled from the second link 120 and begins to be wound around the second pulley 164. Consequently, the length of the second wire 150 between the second wire fixing portion 134 and the fourth wire fixing portion 214 is always held constant.

Figure 3:
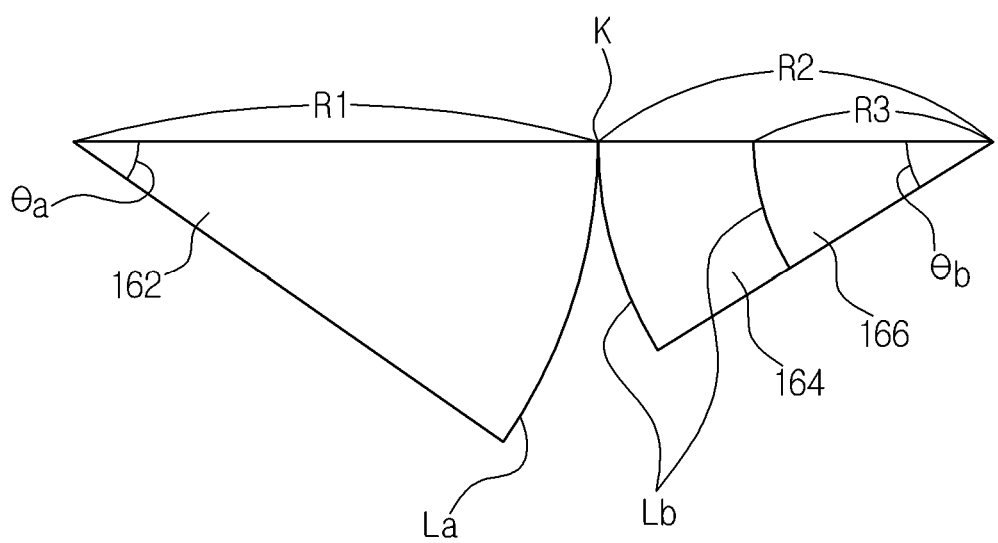
FIG. 3 is a diagram for explaining a rotation ratio between a first interlocking gear and a second interlocking gear to hold constant lengths of a first wire and a second wire constant.

FIG. 3 is a diagram for explaining a rotation ratio between the first interlocking gear and the second interlocking gear to hold constant the lengths of the wires 140 and 150 constant.

As shown in FIG. 3, assuming that the length of the first wire 140 between the first wire fixing portion 132 and the third wire fixing portion 212 is held constant when the second link 120 and the first interlocking gear 172 rotate in the first direction A by $\theta a°$ and the second pulley 164 interlocks with the second link 120 and the first interlocking gear 172 and rotates in the second direction B by $\theta b°$, the decreased length La of the first wire 140 from the first wire fixing portion 132 to the point K at which the first wire 140 is decoupled from the second link 120 and begins to be wound around the second pulley 164 is expressed by the following Equation 1.

$$La = R1 \times \theta a \quad (1)$$

Meanwhile, the increased length Lb of the first wire 140 to the third wire fixing portion 212 from the point K at which the first wire 140 is decoupled from the second link 120 and begins to be wound around the second pulley 164 is expressed by the following Equation 2.

$$Lb = (R2 \times \theta b) + (R3 \times \theta b) \quad (2)$$

In addition, since the sum of the radius R3 of the third pulley 166 and the diameter 2×R4 of each of the pair of fourth pulleys 168a and 168b is equal to the radius R2 of the second pulley 164, the following Equation 3 may be established.

$$R2 = R3 + (2 \times R4) \quad (3)$$

The following Equation 4 is obtained by substituting Equation (3) into Equation (2).

$$Lb = 2 \times \theta b \times (R3 + R4) \quad (4)$$

Since the decreased length La of the first wire 140 from the first wire fixing portion 132 to the point K at which the first wire 140 is decoupled from the second link 120 and begins to be wound around the second pulley 164 is equal to the increased length Lb of the first wire 140 to the third wire fixing portion 212 from the point K at which the first wire 140 is decoupled from the second link 120 and begins to be wound around the second pulley 164, the following Equation 5 is satisfied.

$$R1 \times \theta a = 2 \times \theta b \times (R3 + R4) \quad (5)$$

The following Equation 6 is obtained by rearranging Equation (5).

$$\theta a/\theta b = 2 \times (R3+R4)/R1 \qquad (6)$$

Accordingly, the rotation ratio between the first interlocking gear 172 and the second interlocking gear 174 to hold constant the length of the first wire 140 constant is expressed by the following Equation 7.

$$\theta a:\theta b = 2 \times (R3+R4):R1 \qquad (7)$$

The rotation ratio between the first interlocking gear 172 and the second interlocking gear 174 to hold constant the length of the second wire 150 is the same as described above, so no detailed description will be provided.

As described above, since the length of the first wire 140 between the first wire fixing portion 132 and the third wire fixing portion 212 and the length of the second wire 150 between the second wire fixing portion 134 and the fourth wire fixing portion 214 by interlocking of the first and second interlocking gears 172 and 174 are always held constant during rotation of the second link 120 in the first direction A or the second direction B, the third link 130 is prevented from rotating relative to the second link 120 in an unwanted direction.

Another example will now be described. No description will be provided of the same parts as example described above.

Figure 4A:
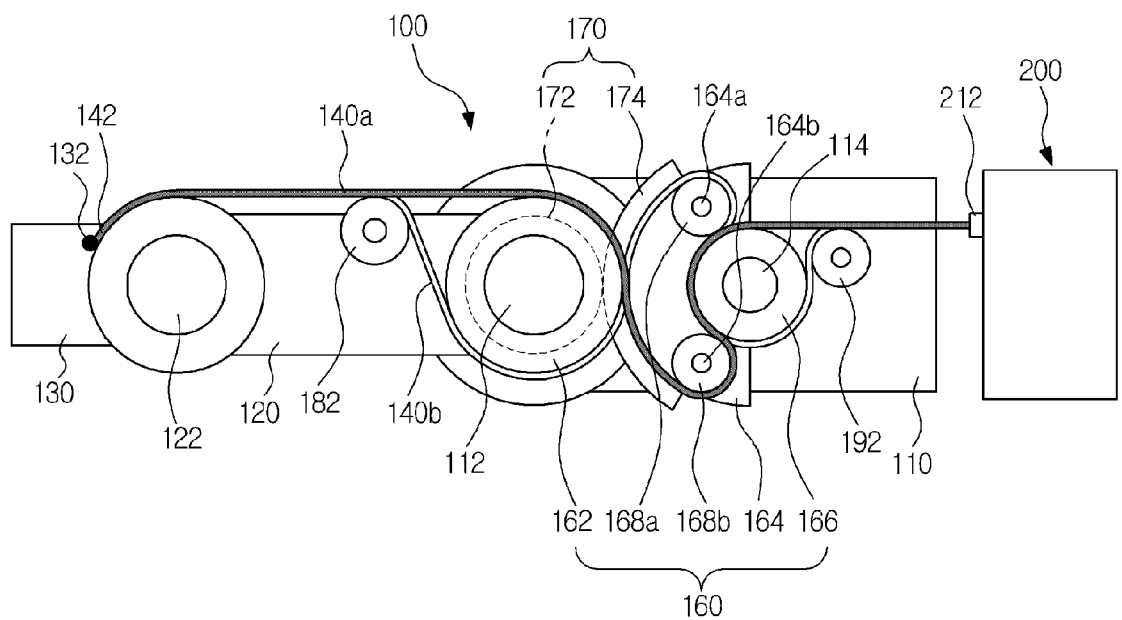
FIGS. 4A and 4B illustrate another example of a link unit and a drive unit, and illustrate an example of a structure that forms paths of a pair of first wires and a pair of second wires.
Figure 4B:
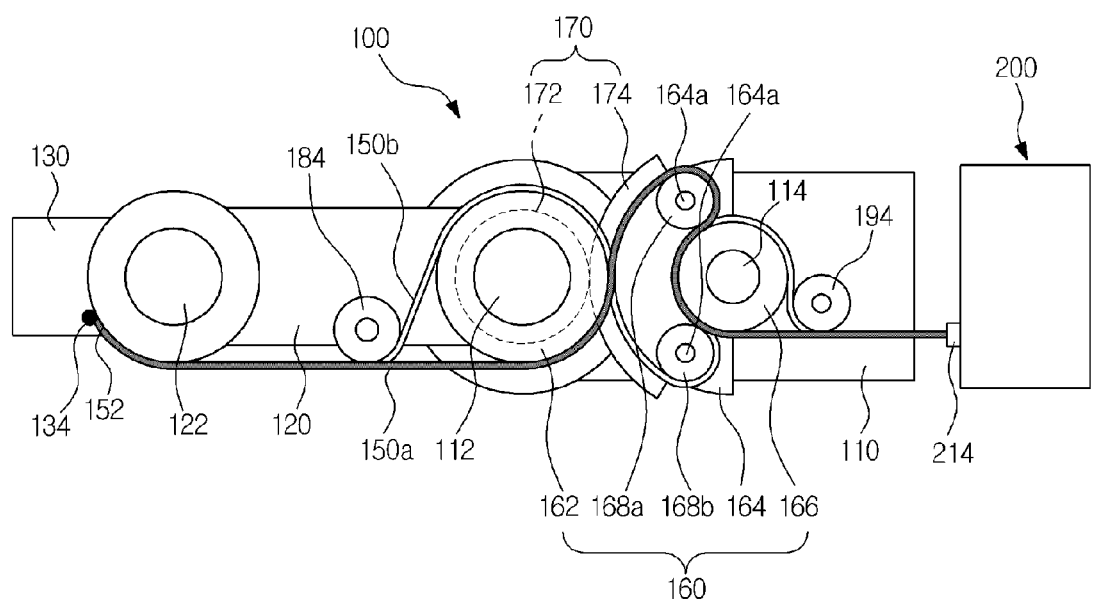

FIGS. 4A and 4B are diagrams illustrating a link unit and a drive unit according to another example, and illustrating a structure forming paths of a pair of first wires and a pair of second wires.

Although the pair of first wires 140*a* and 140*b* and the pair of second wires 150*a* and 150*b* are included in the same link unit and are simultaneously operated, the first wires 140*a* are shown in FIG. 4A and the second wires 140*b* are shown in FIG. 4B for convenience of description.

As shown in FIGS. 4A and 4B, the wires 140*a*, 140*b*, 150*a*, and 150*b* include a pair of first wires 140*a* and 140*b* and a pair of second wires 150*a* and 150*b*. The link unit 100 further includes a first divergence roller 182 disposed between the third link 130 and the first pulley 162 to diverge the pair of first wires 140*a* and 140*b*, a second divergence roller 184 spaced apart from the first divergence roller 182 and disposed between the third link 130 and the first pulley 162 to diverge the pair of second wires 150*a* and 150*b*, a first coupling roller 192 disposed between the third pulley 166 and the drive unit 200 to couple the pair of first wires 140*a* and 140*b* diverged by the first divergence roller 182, and a second coupling roller 194 spaced apart from the first coupling roller 192 and disposed between the third pulley 166 and the drive unit 200 to couple the pair of second wires 150*a* and 150*b* diverged by the second divergence roller 184.

As shown in FIG. 4A, the pair of first wires 140*a* and 140*b* are fixed to the first wire fixing portion 132, move along the second link 120, and are diverged by the first divergence roller 182. The diverged wires 140*a* and 140*b* are wound around each of the first pulley 162, the second pulley 164, the fourth pulleys 168*a* and 168*b*, and the third pulley 166 in opposite directions to each other, and are coupled again by the first coupling roller 192. Then, the coupled wires 140*a* and 140*b* are fixed together to the third wire fixing portion 212 of the drive unit 200.

As shown in FIG. 4B, the pair of second wires 150*a* and 150*b* are fixed to the second wire fixing portion 134, move along the second link 120, and are diverged by the second divergence roller 184. The diverged wires 150*a* and 150*b* are wound around each of the first pulley 162, the second pulley 164, the fourth pulleys 168*a* and 168*b*, and the third pulley 166 in opposite directions to each other, and are coupled again by the second coupling roller 194. Then, the coupled wires 150*a* and 150*b* are fixed together to the fourth wire fixing portion 214 of the drive unit 200.

By providing a structure of diverging and coupling the plural wires 140*a*, 140*b*, 150*a*, and 150*b* as described above, it may be possible to eliminate torque disturbance occurring in the second link 120 due to a difference in tensions applied to the pair of first wires 140*a* and 140*b* and the pair of second wires 150*a* and 150*b*.

Figure 5A:
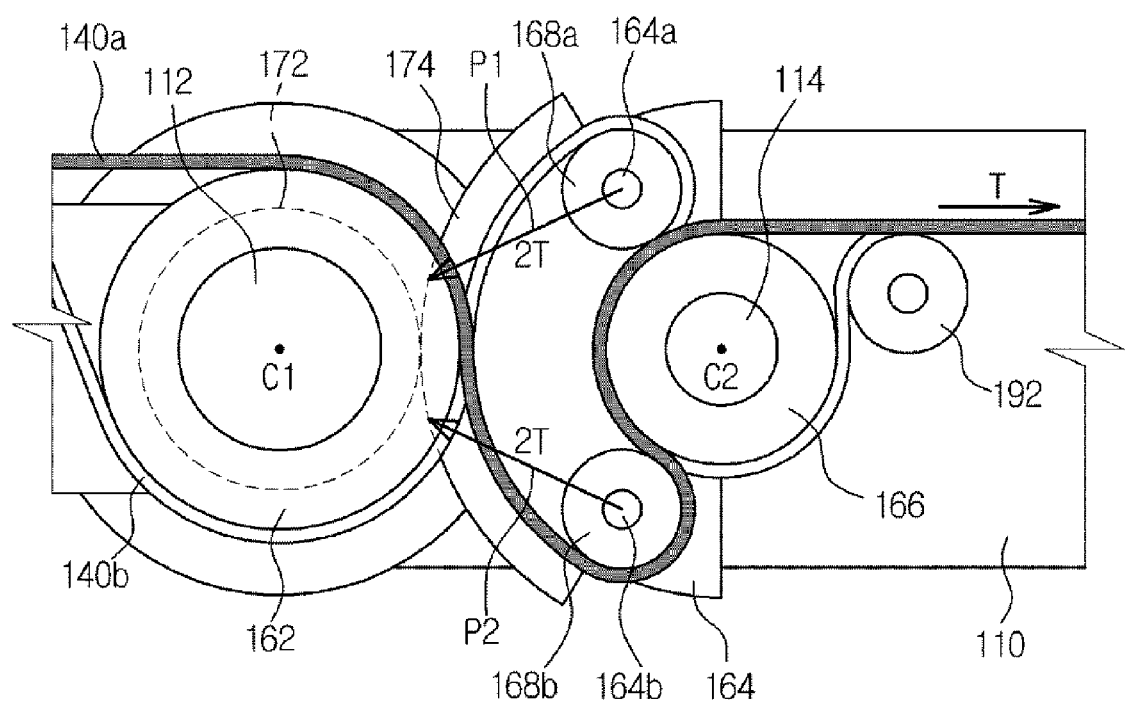
FIGS. 5A and 5B are diagrams for explaining a principle by which a difference in tensions applied to the first wires and the second wires is offset.
Figure 5B:
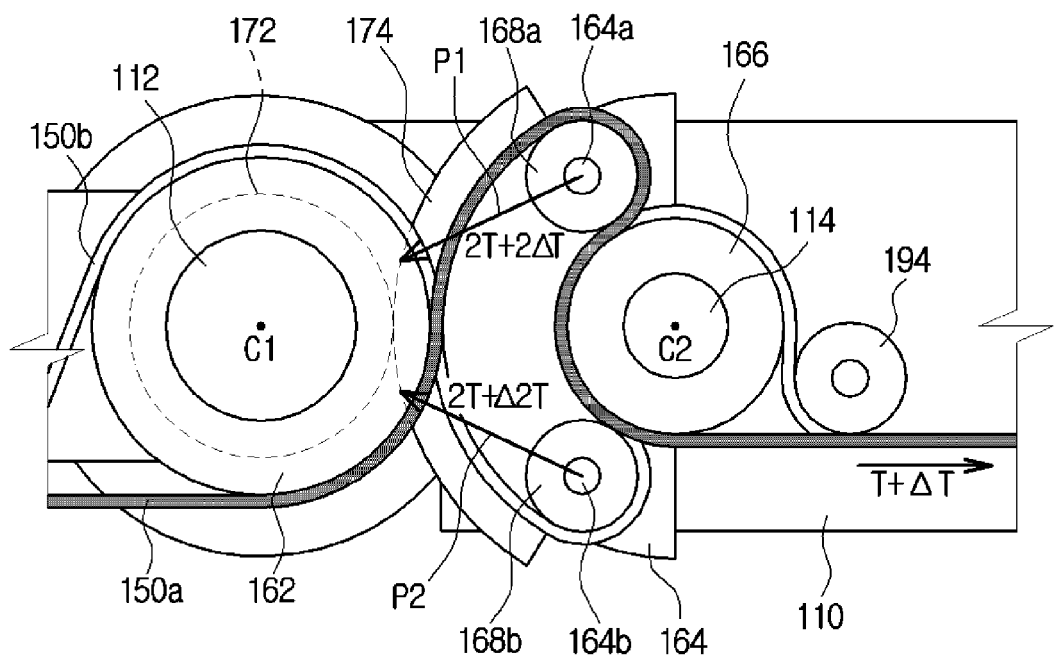

FIGS. 5A and 5B are diagrams for explaining a principle in which a difference in tensions applied to the first wires and the second wires is offset.

As shown in FIGS. 5A and 5B, when a difference $\Delta T$ is generated between a tension T applied to the pair of first wires 140*a* and 140*b* and a tension $T+\Delta T$ applied to the pair of second wires 150*a* and 150*b*, a force 2T applied in each of directions P1 and P2 toward a center of rotation C1 of the first pulley 162 by the pair of first wires 140*a* and 140*b* and a force $2T+2\Delta T$ applied in each of directions P1 and P2 toward a center of rotation C1 of the first pulley 162 by the pair of second wires 150*a* and 150*b* are applied to each of the fourth pulleys 168*a* and 168*b*. Thus, the magnitude of the resultant force F1 applied to the fourth pulley 168*a* of the fourth pulleys 168*a* and 168*b* is $2T+2T+2\Delta T$, and the direction of the resultant force F1 applied thereto is a direction P1 toward the center of rotation C1 of the first pulley 162. In addition, the magnitude of the resultant force F2 applied to fourth pulley 168*b* of the fourth pulleys 168*a* and 168*b* is $2T+2T+2\Delta T$, and the direction of the resultant force F2 applied thereto is a direction P2 toward the center of rotation C1 of the first pulley 162.

Since the fourth pulleys 168*a* and 168*b* are symmetrically arranged with respect to the straight line L1 joining the center of rotation C1 of the first pulley 162 and the center of rotation C2 of the second pulley 164 as described above in connection with FIGS. 1 to 2B, an overlapping direction of the resultant force F1 applied to the fourth pulley 168*a* of the fourth pulleys 168*a* and 168*b* and the resultant force F2 applied to the fourth pulley 168*b* of the fourth pulleys 168*a* and 168*b* is parallel with the straight line L1 joining the center of rotation C1 of the first pulley 162 and the center of rotation C2 of the second pulley 164. Therefore, the torque disturbance occurring in the second link 120 due to a difference in tensions applied to the pair of first wires 140*a* and 140*b* and the pair of second wires 150*a* and 150*b* is offset, and motion of the second link 120 may be more accurately controlled.

Accordingly, unlike the link unit of the example of FIGS. 1 to 2B, the link unit of the example of FIGS. 4A and 4B includes the pair of first wires 140*a* and 140*b* and the pair of second wires 150*a* and 150*b* diverged in a partial section of the link unit.

While this disclosure includes specific examples, it will be apparent to one of ordinary skill in the art that various changes in form and details may be made in these examples without departing from the spirit and scope of the claims and their equivalents. Suitable results may be achieved if components in a described device are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wire connection apparatus comprising:
a link unit; and
a drive unit configured to drive the link unit;
wherein the link unit comprises:
- a first link;
- a second link rotatably coupled to the first link;
- a third link rotatably coupled to the second link;
- wires, each of which is fixed at one end thereof to the third link, and is fixed at the other end thereof to the drive unit, and through which a driving force is transmitted from the drive unit to the third link;
- a path forming structure comprising a first pulley rotatably coupled to the first rotation shaft, a second pulley rotatably coupled to the second rotation shaft, a third pulley rotatably coupled to the second rotation shaft; and fourth pulleys rotatably coupled to the second pulley and configured to form a path of each of the wires between the drive unit and the third link; and
- a length holding structure to hold constant a length of each of the wires between the drive unit and the third link.

2. The wire connection apparatus of claim 1, wherein the first link comprises a first rotation shaft and a second rotation shaft that are spaced apart from each other; and
the second link is rotatably coupled to the first rotation shaft.

3. The wire connection apparatus of claim 2, wherein the wires are wound around the first pulley, the second pulley, the fourth pulleys, and the third pulley in serial order from the third link to the drive unit.

4. The wire connection apparatus of claim 3, wherein the wires comprise a first wire and a second wire; and
the first wire is wound around the first pulley in a first direction, wound around the second pulley and the fourth pulleys in a second direction opposite to the first direction, and wound around the third pulley in the first direction.

5. The wire connection apparatus of claim 4, wherein the second wire is wound around each of the first pulley, the second pulley, the fourth pulleys, and the third pulley in a direction opposite to the direction in which the first wire is wound around each of the first pulley, the second pulley, the fourth pulleys, and the third pulley.

6. The wire connection apparatus of claim 2, wherein the length holding structure comprises:
a first interlocking gear arranged in the second link; and
a second interlocking gear arranged in the second pulley to engage with the first interlocking gear.

7. The wire connection apparatus of claim 6, wherein the second interlocking gear is configured to rotate in a direction opposite to the second link.

8. The wire connection apparatus of claim 2, wherein a sum of a radius of the first pulley and a radius of the second pulley is equal to a length of a straight line between a center of rotation of the first pulley and a center of rotation of the second pulley.

9. The wire connection apparatus of claim 2, wherein a sum of a radius of the third pulley and a diameter of each of the fourth pulleys is equal to a radius of the second pulley.

10. The wire connection apparatus of claim 2, wherein the fourth pulleys are a pair of fourth pulleys; and
the pair of fourth pulleys are symmetrically arranged with respect to a straight line joining a center of rotation of the first pulley and a center of rotation of the second pulley.

11. The wire connection apparatus of claim 2, wherein the plurality of wires comprise a pair of first wires and a pair of second wires; and
the wire connection apparatus further comprises:
a first divergence roller disposed between the third link and the first pulley to diverge the pair of first wires from each other;
a second divergence roller disposed between the third link and the first pulley to diverge the pair of second wires from each other;
a first coupling roller disposed between the third pulley and the drive unit to couple together the pair of first wires that are diverged from each other; and
a second coupling roller disposed between the third pulley and the drive unit to couple together the pair of second wires that are diverged from each other;
wherein the pair of first wires and the pair of second wires are wound around the first pulley, the second pulley, the fourth pulleys, and the third pulley in directions opposite to each other.

12. A wire connection apparatus comprising:
a link unit; and
a drive unit configured to drive the link unit;
wherein the link unit comprises:
a first link;
a second link rotatably coupled to the first link;
a third link rotatably coupled to the second link;
a first pulley configured to freely rotate about a same axis as the second link;
a second pulley configured to interlock with the second link and rotate as the second link rotates;
a third pulley configured to freely rotate about a same axis as the second pulley;
fourth pulleys coupled to the second pulley and configured to freely rotate; and
wires connected from the third link to the drive unit via, in serial order, the first pulley, the second pulley, the fourth pulleys, and the third pulley.

13. The wire connection apparatus of claim 12, wherein the wires comprise a first wire and a second wire;
the first wire is wound around the first pulley in a first direction, wound around the second pulley and a first one of the fourth pulleys in a second direction opposite to the first direction, and wound around the third pulley in the first direction; and
the second wire is wound around each of the first pulley, the second pulley, a second one of the fourth pulleys, and the third pulley in a direction opposite to the direction in which the first wire is wound around each of the first pulley, the second pulley, the first one of the fourth pulleys, and the third pulley.

14. The wire connection apparatus of claim 13, further comprising:
a first interlocking gear arranged in the second link; and
a second interlocking gear arranged in the second pulley to engage with the first interlocking gear.

15. The wire connection apparatus of claim 14, wherein the second pulley is configured to rotate in the second direction as the second link rotates in the first direction to hold constant respective lengths of the first wire and the second wire between the third link and the drive unit; and
the second pulley is further configured to rotate in the first direction as the second link rotates in the second to hold constant the respective lengths of the first wire and the second wire between the third link and the drive unit.

16. The wire connection apparatus of claim 12, wherein the wires comprise a pair of first wires and a pair of second wires; and the wire connection apparatus further comprises:

a first divergence roller disposed between the third link and the first pulley to diverge the pair of first wires from each other;

a second divergence roller disposed between the third link and the first pulley to diverge the pair of second wires from each other;

a first coupling roller disposed between the third pulley and the drive unit to couple the pair of first wires that are diverged from each other; and a second coupling roller disposed between the third pulley and the drive unit to couple the pair of second wires that are diverged from each other.

17. A wire connection apparatus comprising:

a base link comprising a first pulley coupled to a first rotation shaft, a second pulley coupled to a second rotation shaft, a third pulley coupled to the second rotation shaft, and fourth pulleys coupled to the second pulley;

a middle link rotatably coupled to the base link and configured to rotate relative to the base link without changing an axis of rotation of the middle link;

an end effecter rotatably coupled to the middle link; and a wire traversing a path along the base link and the middle link from a reference point and fixed to the end effecter;

wherein a length of the at least one wire from the reference point to the end effecter is held constant in response to the middle link rotating.

18. The wire connection apparatus of claim 17, further comprising a drive unit;

wherein the reference point is a portion of the drive unit.

19. The wire connection apparatus of claim 17, wherein the at least one wire comprises:

a first wire traversing a first path between the reference point and the end effecter; and a second wire traversing a second path different from the first path between the reference point and the end effecter.

20. The wire connection apparatus of claim 17, wherein the wire comprises a pair of wires that are diverged from each other in at least a partial section of the connection apparatus between the reference point and the end effecter.

* * * * *